United States Patent
Asvatha Narayanan et al.

(10) Patent No.: US 9,443,162 B2
(45) Date of Patent: Sep. 13, 2016

(54) INTELLIGENT BACKGROUND SELECTION AND IMAGE SEGMENTATION

(71) Applicant: Aricent Technologies Luxembourg s.a.r.l., Luxembourg (LU)

(72) Inventors: Vishnu Vardhanan Asvatha Narayanan, Bangalore (IN); Sk Sahariyaz Zaman, Bangalore (IN)

(73) Assignee: Aricent Holdings Luxembourg S.A.R.L., Luxembourg (LU)

( * ) Notice: Subject to any disclaimer, the term of this patent is extended or adjusted under 35 U.S.C. 154(b) by 0 days.

(21) Appl. No.: 14/496,544

(22) Filed: Sep. 25, 2014

(65) Prior Publication Data

US 2016/0092746 A1    Mar. 31, 2016

(51) Int. Cl.
G06K 9/00    (2006.01)
G06K 9/38    (2006.01)
G06K 9/34    (2006.01)
G06T 7/00    (2006.01)

(52) U.S. Cl.
CPC . G06K 9/38 (2013.01); G06K 9/34 (2013.01); G06T 7/0081 (2013.01); G06T 7/0083 (2013.01); G06T 2207/20144 (2013.01)

(58) Field of Classification Search
CPC ............... G06T 7/0081; G06T 7/0083; G06T 2207/20144; G06T 2207/10016; G06F 17/30257; G06F 17/3024; G06K 9/00718; H04N 1/40062
See application file for complete search history.

(56) References Cited

U.S. PATENT DOCUMENTS 7,184,589 B2 *   2/2007   Okubo ................... H04N 1/642
                                                        382/166
8,077,969 B2 *  12/2011   Rossato ................ G06T 7/0083
                                                        345/619

(Continued)

OTHER PUBLICATIONS

Dingding Liu, Kari Pulli, Linda G. Shapiro and Yingen Xiong, Fast Interactive Image Segmentation by Discriminative Clustering, Proceeding of the 2010 ACM Multimedia Workshop on Mobile Cloud Media Computing, MCMC, 2010, 6 pages, Firenze, Italy.

(Continued)

*Primary Examiner* — Amir Alavi
(74) *Attorney, Agent, or Firm* — Harrington & Smith (57) ABSTRACT

Certain embodiments of these teachings take inputs of a) an image to be segmented and b) a set of user input markers that identify at least a foreground of said image. From these inputs are determined strong foreground regions $S_f$, strong background regions $S_b$ and ambiguous regions G. Each ambiguous region $G_i$ is classified as either a weak foreground region $W_f$ or a weak background region $W_b$ by comparing color of each ambiguous region $G_i$ against color of regions adjacent thereto and merging the respective ambiguous region $G_i$ with its adjacent region having a most similar color. The strong foreground regions $S_f$ are also merged with the weak foreground regions $W_f$. What is output therefrom is a foreground image of the image to be segmented, separate and distinct from any region that is classified as one of the strong background regions or weak background regions.

20 Claims, 7 Drawing Sheets

(56) References Cited

U.S. PATENT DOCUMENTS

| | | | |
|---|---|---|---|
| 8,094,943 B2* | 1/2012 | Eaton | G06K 9/38 382/190 |
| 8,204,316 B2* | 6/2012 | Panahpour Tehrani | G06T 7/208 382/173 |
| 8,855,381 B2* | 10/2014 | Monden | G06K 9/00107 382/124 |
| 9,066,036 B2* | 6/2015 | Chen | H04N 1/40093 |
| 9,152,878 B2* | 10/2015 | Dai | G06K 9/4652 |
| 2012/0236184 A1* | 9/2012 | Jia | G06T 5/005 348/241 |

OTHER PUBLICATIONS

Jifeng Ning, Lei Zhang, David Zhang and Chengke Wu, Interactive Image Segmentation by Maximal Similarity Based Region Merging, Pattern Recognition 43 (2010) 445-456, 12 pages.

Carsten Rother, Andrew Blake and Vladimir Kolmogorov, "GrabCut"—Interactive Foreground Extraction Using Iterated Graph Cuts, Microsoft Research, ACM SIGGRAPH 2004 papers, pp. 309-314, 6 pages, UK.

Herve Lombaert, Yiyong Sun, Leo Grady and Chenyang Xu, A Multilevel Banded Graph Cuts Method for Fast Image Segmentation, Proceedings of the Tenth IEEE International Conference on Computer Vision, ICCV 2005, vol. 1, pp. 259-265, 7 pages, Princeton, NJ. 08540, USA.

Ying Li, Jian Sun, Chi-Keung Tang and Keung-Yeung Shum, Lazy Snapping, Hong Kong University of Science and Technology, Microsoft Research Asia, ACM SIGGRAPH 2004 papers, pp. 303-308, 6 pages.

Pablo Arbelaez, Michael Maire, Charless Fowlkes and Jitendra Malik, Contour Detection and Hierarchical Image Segmentation. IEEE Trans. Pattern Anal. Mach. Intell., 33(5) pp. 303-308, 2004, 20 pages.

Dorin Comaniciu and Peter Meer, Mean Shift: A Robust Approach Toward Feature Space Analysis, IEEE Transactions on Pattern Analysis and Machine Intelligence, vol. 24, No. 5, May 2002, 17 pages.

Luc Vincent and Pierre Soille, Watersheds in Digital Spaces: An Efficient Algorithm Based on Immersion Simulations, IEEE Transactions on Pattern Analysis and Machine Intelligence, vol. 13, No. 6, Jun. 1991, 16 pages.

Dorin Comaniciu, Visvanathan Ramesh and Peter Meer, Kernel-Based Object Tracking, IEEE Transactions on Pattern Analysis and Machine Intelligence, vol. 25, No. 5, May 2003, 14 pages.

Thomas Kailath, The Divergence and Bhattacharyya Distance Measures in Signal Selection, IEEE Transactions on Communication Technology, vol. COM-15, No. 1, Feb. 1967, 9 pages.

Jerome H. Friedman, Jon Louis Bentley and Raphael Ari Finkel, An Algorithm for Finding Best Matches in Logarithmic Expected Time, Associated for Computing Machinery, Inc., ACM Transactions on Mathematical Software, vol. 3, No. 3, Sep. 1977, pp. 209-226, 18 pages.

\* cited by examiner

INTELLIGENT BACKGROUND SELECTION AND IMAGE SEGMENTATION

TECHNICAL FIELD

The invention relates generally to multimedia applications; image and video editing; image cut-outs; and selective filtering. Specifically, embodiments of the present invention relate to methods for image segmentation to separate foreground from background.

BACKGROUND

Image segmentation is a challenging problem in computer graphics, particularly with respect to digitally separating a desired object (foreground) from a background of the digital image. Such separation is useful during digital editing of still images and video. Fully automatic segmentation has been a very difficult task to effectively apply over a wide variety of images due to the difficulty in segregating a desired object from a background in an image. For this reason, methods for interactive image segmentation have recently received much attention.

Several approaches have been suggested, and some of which are relevant to these teachings are described in the following documents. [1] FAST INTERACTIVE IMAGE SEGMENTATION BY DISCRIMINATIVE CLUSTERING, *Proceedings of the 2010 ACM Multimedia Workshop on Mobile Cloud Media Computing, MCMC '10*, pages 47-52, 2010, by Dingding Liu, Kari Pulli, Linda G. Shapiro and Yingen Xiong; [2] INTERACTIVE IMAGE SEGMENTATION BY MAXIMAL SIMILARITY BASED REGION MERGING, *Pattern Recogn.*, 43(2): 445-456, February 2010, by Jifeng Ning, Lei Zhang, David Zhang, and Chengke Wu; [3]"GRABCUT": INTERACTIVE FOREGROUND EXTRACTION USING ITERATED GRAPH CUTS, *ACM SIGGRAPH* 2004 *Papers*, SIGGRAPH '04, pages 309-314, 2004, by Carsten Rother, Vladimir Kolmogorov, and Andrew Blake; [4] A MULTILEVEL BANDED GRAPH CUTS METHOD FOR FAST IMAGE SEGMENTATION, *Proceedings of the Tenth IEEE international Conference on Computer Vision (ICCV '05)*, ICCV '05, pages 259-265, 2005, by Hez-ve Lombaert. Yiyong Sun, Leo Grady, and Chenyang Xu; [5] LAZY SNAPPING, *ACM SIGGRAPH* 2004 *Papers*, SIGGRAPH '04, pages 303-308, 2004 by Yin Li, Jian Sun, Chi-Keung Tang, and Heung-Yeung Shum; and [6] CONTOUR DETECTION AND HIERARCHICAL IMAGE SEGMENTATION, *IEEE Trans. Pattern Anal. Mach. Intell.*, 33(5)898-916, May 2011, by Pablo Arbelaez, Michael Maire, Chanless Fowlkes, and Jitendra Malik.

These approaches generally require significant user guidance and are particularly inaccurate when an object is close to a boundary of the image. At least references [1-5] require the user to manually mark both a background region and foreground region. The inventors have found that these approaches tend to be less accurate in discriminating foreground from background when the true foreground extends to or very near a border/outer boundary of the overall image being segmented. Therefore there is a need for an image segmentation approach that better distinguishes foreground from background at least in those instances, and preferably one that does so with fewer manual user inputs so as to result in a generally more automated system.

SUMMARY

Embodiments of the present invention are directed to an apparatus such as a host computing device, a method and a computer readable memory that satisfy the need for reducing user guidance for background selection and image segmentation while maintaining accurate results in discriminating foreground from background.

A method having certain features of these teachings comprises:
  using a set of user input foreground markers identifying a foreground of an image to be segmented, defining $N_f$ foreground regions and $N_b$ background regions, where $N_f$ is an integer greater than zero and $N_b$ is an integer at least zero;
  for each respective border region that defines a border of the image and is not one of the $N_f$ foreground regions, performing a multi-level assessment of the respective border region to determine whether the respective border region is a possible foreground region, where each level of the multi-level assessment compares color similarity, with respect to a threshold that is specific for that level, between the respective border region and any of the $N_f$ foreground regions or of a region that satisfied the threshold of a previous level of the multi-level assessment;
  from the multi-level assessment and the foreground markers, classifying each region of the image to be segmented as one of a strong foreground region, a strong background region or an ambiguous region;
  classifying each of the respective ambiguous regions as a weak foreground region or a weak background region; and
  merging the strong foreground regions with the weak foreground regions and output therefrom, to a tangible memory or to a graphical display, a foreground image of the image to be segmented, separate and distinct from any region classified as one of the strong background regions or weak background regions.

Another method according to these teachings comprises:
  from inputs of an image to be segmented and a set of user input markers identifying at least a foreground of said image, determining strong foreground regions $S_f$, strong background regions $S_b$ and ambiguous regions G;
  classifying each ambiguous region $G_i$ as either a weak foreground region $W_f$ or a weak background region $W_b$ by comparing color of each ambiguous region $G_i$ against color of regions adjacent thereto and merging the respective ambiguous region $G_i$ with its adjacent region having a most similar color; and
  merging the strong foreground regions $S_f$ with the weak foreground regions $W_f$ and outputting therefrom, to a tangible memory or to a graphical display, a foreground image of the image to be segmented, separate and distinct from any region classified as one of the strong background regions or weak background regions.

A computing device or other such apparatus embodying the teachings herein may comprise at least one digital processor and a computer readable memory storing a computer readable program/computer executable code which when executed by the at least one processor causes the apparatus to perform either or both of the methods essentially as summarized above. Other embodiments implementing these teachings may comprise the computer readable memory on which is stored such a program or executable code, which may then be distributed to end users who may then install the program from that memory onto their own computer's native memory or have their computer run the program directly from the non-native memory itself.

BRIEF DESCRIPTION OF THE DRAWINGS

These and other features, aspects, and advantages of the present invention will become better understood with regard to the following description, appended claims, and accompanying drawings, where:

DETAILED DESCRIPTION

In the Summary above and in the Detailed Description and the claims below, and in the accompanying drawings, reference is made to particular features (including method steps) of the invention. It is to be understood that these various features may be combined despite that the description herein does not explore explicitly every single such possible combination. The specific embodiments that are detailed with particularity herein are not a limit to the general teachings herein, and such exemplary embodiments by themselves are not a limit to the scope of the ensuing claims but rather teach the principles of the invention and illuminate the meaning of such ensuing claims.

The documents mentioned in the background section describe interactive image segmentation approaches. An interactive image segmentation approach requires some user inputs, typically markers created and input by a user that show which portions of an image are background portions and which portions of the image are foreground portions. If both foreground and background have the same shades of color, then an algorithm must decide whether to omit the color which is similar to foreground when segmenting the image. Background segregation from an assumed default background plays an important role in accurate segmentation. The default background is obtained from the region of interest (ROI) provided from the user.

Efficient energy minimization algorithms, such as graph cuts, are widely used to label the unmarked pixels in interactive segmentation, for example by documents [4] and [5] in the background section. The main steps from document [5] are object marking followed by boundary editing. However, research from document [2] confirmed that accurate segmentation of an image requires enough foreground and background samples. Document [2] suggests using a color histogram of a region to perform Maximally Similar Region Merging (MSRM) by which to merge small regions into background. The red/green/blue (RGB) colors are uniformly quantized into 16 levels per channel and histograms of 16×16×16=4096 bins are used to estimate region similarity. Although this resulted in better segmentation quality than if graph cuts were used with the same markers, document [2] considers only local information in this merging process. Each of the approaches described by documents [1-5] requires extensive use of background and foreground markers and often do not perform proper segmentation when the object is at the border/boundary of the image being segmented.

Embodiments of the invention address these limitations by providing (i) robust object segmentation with intelligent background selection with respect to user marked foreground; (ii) refinement in usage of the obtained foreground regions; and (iii) object segmentation using very few or even no background markers.

Figure 1:
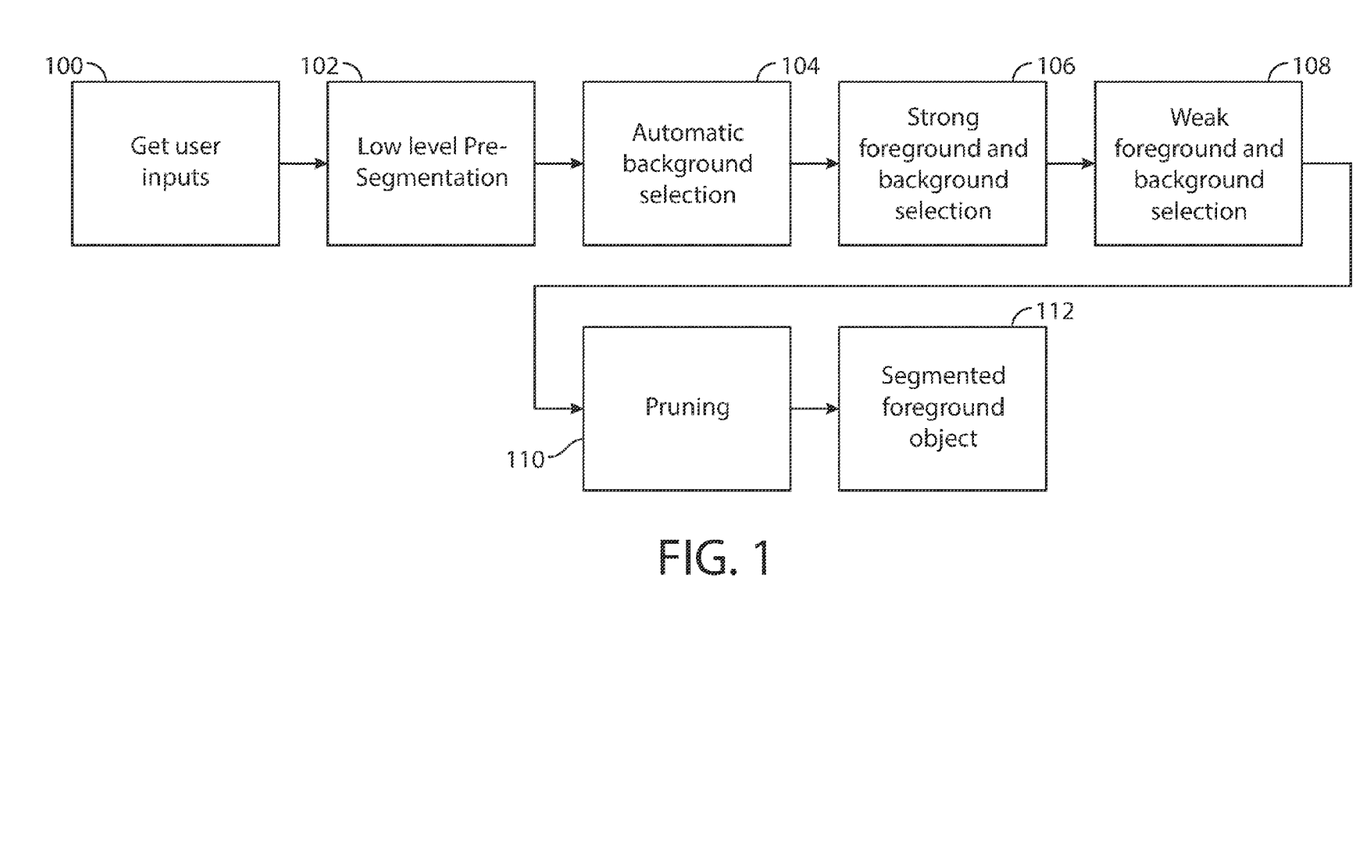
FIG. 1 shows a high level flow chart according to an example embodiment of the invention.

FIG. 1 shows a high level flow chart of embodiments of the invention. Each step of the flow chart is detailed more thoroughly below. The set of foreground markers, and optionally also background markers, are the first inputs to be provided from the user at step 100. Low-level pre-segmentation is done at step 102, for example using a mean-shift analysis technique. The pre-segmentation is followed by automatic background selection at step 104 which is performed based on a default background. Using these inputs, discriminating filtering is applied for all regions of the image and local neighborhood classification using strong and weak foreground and background information. These are represented in FIG. 1 as steps 106 and 108. The image is pruned at 110 resulting in the segmented foreground object at step 112. The entire process will reduce the number of foreground markers required and require few, if any, background markers. This is the case even when a foreground portion extends to the border of the image being segmented.

Typically for image and video editing the segmented foreground object resulting at step 112 is output, separate and distinct from the remaining background object of the original image that has been segmented. In some cases the outputs will be both foreground and background objects as separate and independent digital files. In any case each output is a digital file, which may be displayed on-screen such as when the digital file remains stored within the internal memory of the computer which performed the image segmentation, or the output may be a removable memory on which is stored such digital file(s), or the output may be a transmission of the digital file(s) over a wired or wireless communication pathway for storage on an external memory.

In some embodiments of the invention the only user markings on the image that is input for segmentation are of foreground areas, while in other embodiments it is advantageous to additionally have user markings of certain background areas. In the prior art referenced in the background section above user markings are required for both foreground and background areas. Assume a user has marked the desired features of an image indicating only a foreground object. These are the user inputs at step 100 of FIG. 1. At low-level pre-segmentation 102, the image is first over-segmented using for example a mean shift algorithm. The mean shift algorithm is a suitable example as it preserves boundaries well in most cases and provides less over segmentation as compared to other low level image processing techniques such as a watershed algorithm, but this is only one non-limiting technique for the pre-segmentation step 102. However implemented, the pre-segmentation step 102 uniquely labels each region, denoted by L.

At automatic background selection step 104, based on the set of inputs markers by the user, a number $N_f$ of foreground regions $M_f$ are defined, and optionally, a number $N_b$ of background regions $M_b$ are defined. Necessarily the number $N_f$ of foreground regions is at least 1 since the user has input a marker identifying it as such, and while in most implementations there will be background regions identified it is possible that, without a user marked background region the number $N_b$ of background regions may in fact be zero at this stage. A default background region B is selected as ROI border regions. In one implementation all border regions of the image that are not marked by the user as a foreground region are considered initially as such default background regions. In exemplary embodiments of the invention, the default background regions are scrutinized against the user marked foreground regions according to the following steps:

(1) For each region $\{B_i\}_{i=1, 2, \ldots, m}$, a set of adjacent regions is formed, denoted as $\overline{S}_B = \{A_j\}_{j=1, 2, \ldots, n}$ for n adjacent regions. An inter color distance $d_j$ is calculated using mean colors in CIELab color space between each region of $B_i$ and its adjacent regions $\overline{S}_B$. CIE is a term of art in the image processing arts representing a uniform color space or scale in terms of RGB, and is not limiting to the broader teachings herein. A Minimum of ($d_j$) is computed to find the most similar adjacent region, which is denoted below as the $k^{th}$ region. The regions are merged under the following criteria:

if $\overline{S}_k^{Aj} \in \{B_i\}$ then, $\overline{S}_k^{Aj} \cup B_i$

If the above criteria is not met then $\overline{S}_k^{Aj}$ and $B_i$ will not be merged. New labels are generated $L_{new}$ and new border regions, $B_{new}$ are obtained. This step allows similar neighbor border regions to be merged into a single region which provides savings to computation cost during execution of the remainder of the algorithm that is detailed below.

(2) Each distance of $\{B_i^{new}\}$ i=1, 2, ... m regions is scrutinized against the distance of $M_f$ user marked foreground regions and the minimum color distance differences restricted with a threshold thr are found by the following equation:

diff $D_i = \min(d(M_f) - d(B_i^{new}{}_{i=1,2,\ldots m}))$

This step determines the border regions that are similar to the user marked foreground regions $M_f$.

(3) The regions satisfied by step (2) immediately above are denoted below as $B_{sim}$. With reference to $B_{sim}$, a color histogram is computed for each border region. In exemplary embodiments, the RGB color space is used to compute the color histogram. Each color channel is, for example, uniformly quantized into 8 levels and a histogram of each border region is calculated in the feature space, for example, of 8×8×8=512 bins. The normalized histogram of each border region $B_{new}$ is denoted by $Hist_{B_{new}}$. The Bhattacharya coefficient, $\rho$, is used to measure the similarity between $m^{th}$ and $n^{th}$ border regions, $$\rho(m, n) = \sum_{u=1}^{512} \sqrt{Hist_m^u \cdot Hist_n^u}$$

where $\rho$ varies from 0 to 1 and superscript u represents the $u^{th}$ element of normalized histogram bin. As is known in the image processing arts, the higher the Bhattacharya coefficient between m and n, the higher the similarity is between them. The normalized histogram $Hist_{B_{new}}$ for each border region is computed and the similarity is measured only for the normalized histogram $Hist_{B_{sim}}$ border regions in this embodiment. The similar regions, designated $B_{mat}$, are finally selected with the following criteria:

$\rho(Hist_{B_{new}}, Hist_{B_{sim}}) > X$ where X is the minimum threshold set for similarity criteria. This step determines the spatially disconnected similar border regions with respect to $B_{sim}$, but also finds similarity for texture related regions.

Using this information, the possible foreground and background regions are obtained.

Possible foreground regions $P_f$ are obtained using:

$P_f = B_{mat} \cup B_{sim}$.

and, possible background regions $P_b$, are obtained using:

$P_b = B_{new} \not\ni P_f$

Figure 2A:
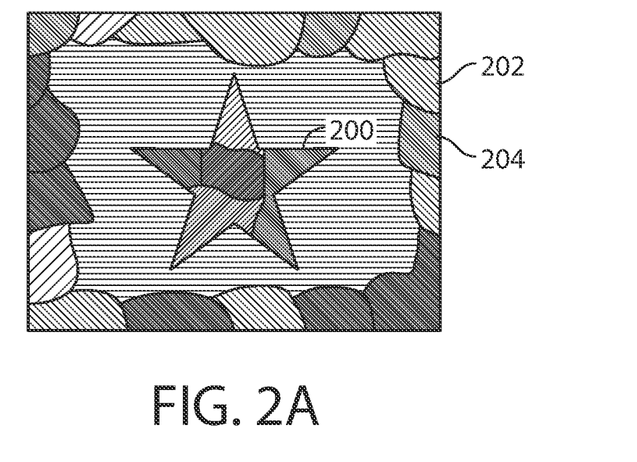
FIGS. 2A and 2B show an image illustrating a user-marked foreground region and also showing border regions that are by default are at first considered background regions according to various embodiments of the invention.
Figure 2B:
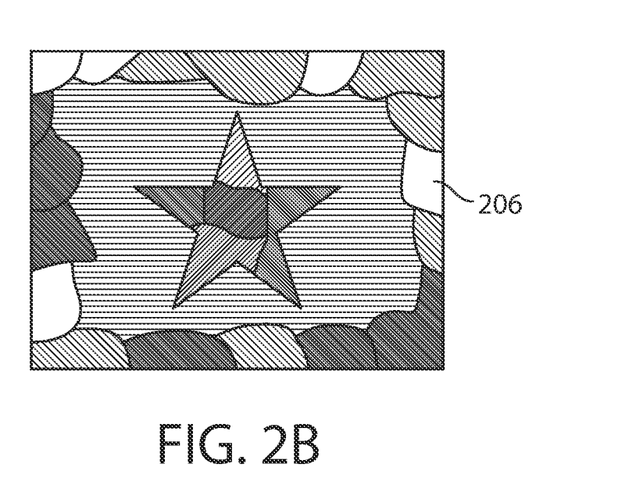

The possible background regions, B, obtained by step 104 are depicted in FIG. 2A as all of the border regions towards the edges of the example image, since in the FIG. 2A-B example no border region is marked by the user as being foreground. The star 200 represents a foreground object. Initially, all of the border regions not marked as foreground are set to a default background based on steps 100 and 102. Regions 202 and 204 represent default background regions. Automatic background selection 104 determines the possible foreground regions $P_f$ which are represented by region 204. Now referring to FIG. 2B, the possible foreground regions 206 have been removed from the background regions which results in a new set of possible background regions, namely $P_b$. That is, at FIG. 2B the shaded border regions are those which are still possible background regions $P_b$, whereas the unshaded border regions 206 are those which have been determined via a color matching analysis to be sufficiently close to a user designated foreground region 200 that they are now considered possible foreground regions $P_f$.

In exemplary embodiments of the invention, at step 106 a set of regions $B_{init}$ is created by $P_b \cup M_b$, where $M_b$ represents the user marked background, if any. If the user has not marked any background regions, then $M_b$ is assigned as NULL. At least $B_{init}$ and the user marked foreground $M_f$ are used as inputs for implementing a discrimination filter. Reference [1] in the background section above details discrimination filters and so such filters need not be further described herein. One particular such discrimination filter uses a k-d tree to classify foreground and background regions, and this is the type of discrimination filter used in the example algorithm according to these teachings which generated the isolated foregrounds shown at FIGS. 3A-B. However implemented, the discrimination filter is configured to output the following three types of regions: strong foreground regions $S_f$; strong background regions $S_b$; and ambiguous regions G.

After classifying the strong foreground regions $S_f$ and strong background regions $S_b$, the ambiguous regions G are then classified as either weak foreground $W_f$ or weak background $W_b$ regions at step 108. To accomplish this, local neighbor region information is used according to the following example process:

(i) For each ambiguous region $\{G_i\}_{i=1, 2, \ldots, m}$, a set of adjacent regions $\overline{S}_B = \{A_j\}_{j=1, 2, \ldots, n}$ is formed. The mean colors in the CIELab color space are used to calculate the inter color distance between each $i^{th}$ ambiguous region $G_i$ and its adjacent regions $\overline{S}_B$. In principle this is similar to the process described above regarding step 104. The minimum color distance ($d_j$) is computed to find the most similar region ($k^{th}$ region). The ambiguous regions $G_i$ are then labeled as $$L_{new}(G_i) = \begin{cases} W_f & \text{if } \overline{S}_k^{Aj} \in \{S_f\} \\ W_b & \text{if } \overline{S}_k^{Aj} \in \{S_b\} \end{cases}$$

If $\overline{S}_k^{Aj} \in \{G_i\}$, then merge:

$$\overline{S}_k^{Aj} \cup \{G_i\}$$

and repeat step (i).

This merging process classifies each ambiguous region as either a weak foreground region $W_f$ or a weak background region $W_b$ to satisfy step 108 of the overall process at FIG. 1. In one embodiment neither the foreground nor background list is updated yet with these classified weak regions to avoid unwanted labeling and user confusion.

In the pruning step 110, some or all of the following three steps are performed to obtain the segmented foreground object 112:

1) Merge the strong and weak foreground regions $SW_f$:

$$SW_f = S_f \cup W_f$$

Similarly, merge the strong and weak background regions $SW_b$:

$$SW_b = S_b \cup W_b;$$

2) Classify any gap of foreground segmentation $SW_f$ which is surrounded by foreground region as foreground region; and 3) Remove isolated foreground regions depending upon the user foreground marker.

Figure 3A:
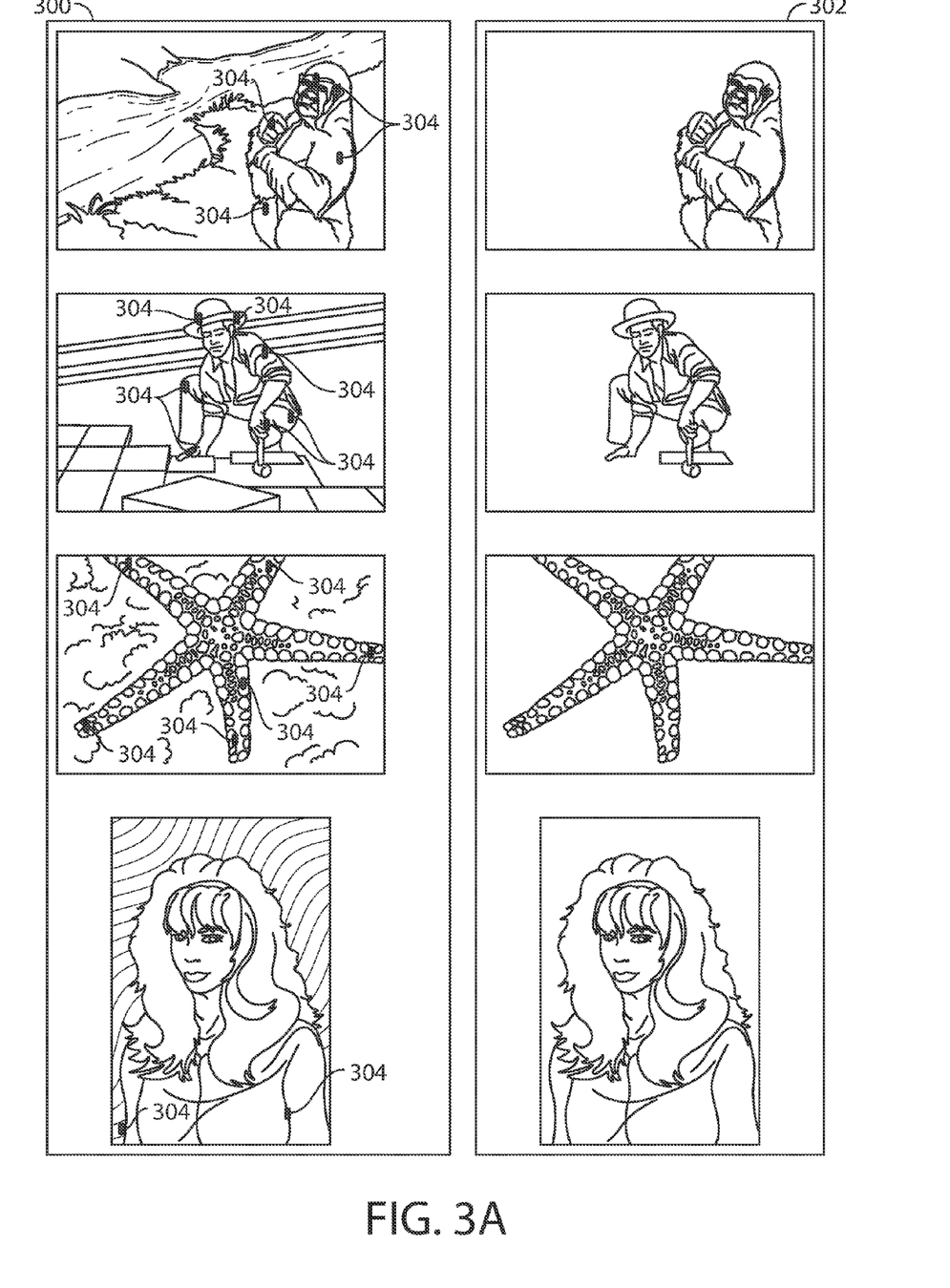
FIGS. 3A and 3B illustrate various types of images to be segmented (left column) and the foreground portions that are segmented and isolated therefrom (right column) and which are output by exemplary embodiments of the invention.

Referring now to FIG. 3A, a first column 300 and a second column 302 of images are shown. The images shown in the first column 300 represent a wide range of image types that are first input for segmentation in the inventors' testing of a specific embodiment of these teachings. Specifically, the gorilla image, in the first row of FIG. 3A, is an image with relatively high contrast and simple texture, where the foreground is connected to the lowermost border of the image. The second row of column 300 shows an image of a man positioned in the center as a foreground object and no part of the man extends to the borders of the image. The third row shows an image with a starfish in the foreground where the starfish has a block texture, part of which extends to the uppermost and right borders of the image. Finally, the forth row shows an image of woman with a complex repeated pattern on her blouse in the foreground which extends to the lowermost, left and right borders of the image.

The gorilla image in column 300 contains a set of input markers, indicated by light shading 304, which the user inputs to identify at least portions of the foreground of the image to be segmented. In the gorilla image, the gorilla is the foreground of the image to be segmented. Each of the other images in column 300 also contains a set of user markers on a foreground of the respective images. Note that none of the input markers in column 300 identify background regions. The images in column 302 show the output of the foreground image after the input image with foreground markers is processed according to an algorithm following these teachings. The gorilla image in column 302 shows the foreground image 306 separate and distinct from any region that is classified, considered or marked as background. The remaining space of the input image (column 300) that is not output as the foreground image (column 302) includes all regions that were classified, considered or marked as background.

Figure 3B:
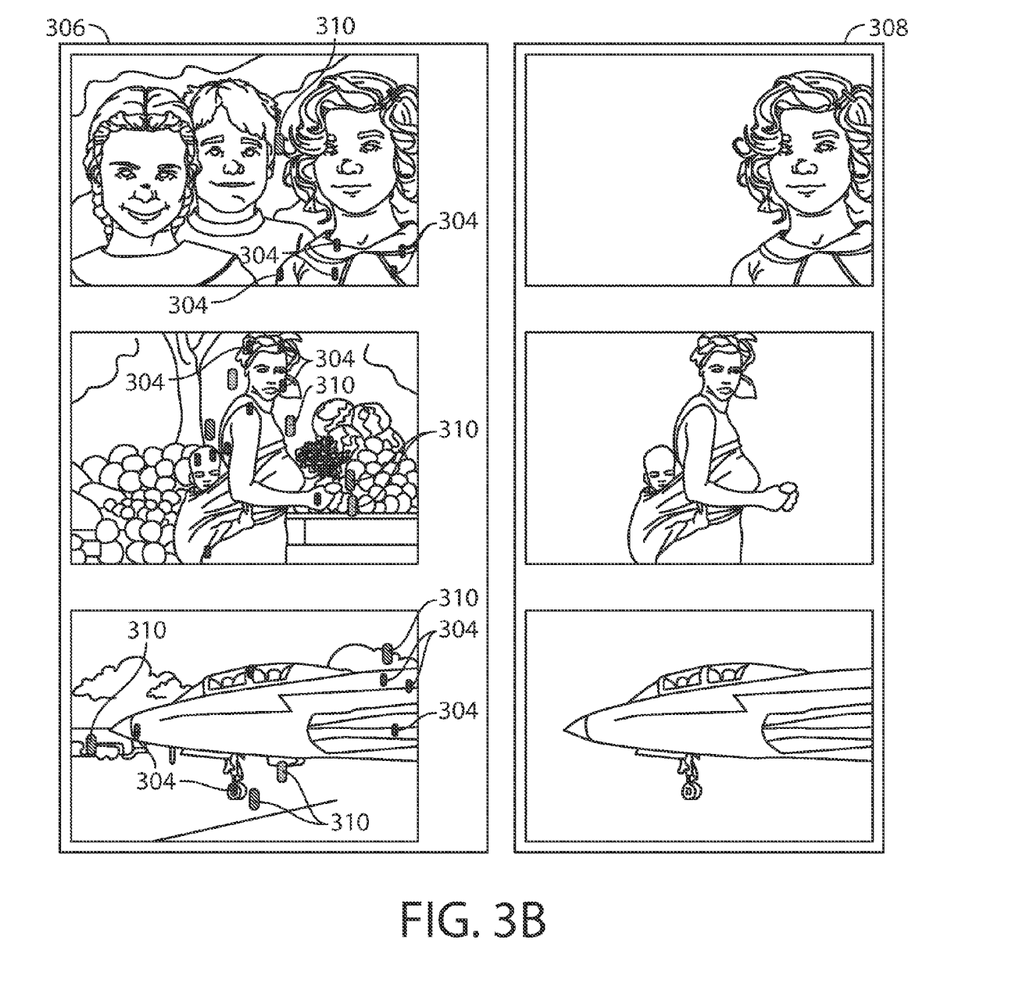

FIG. 3B shows another set of images in column 306 and column 308. The first row in column 306 shows an image with a small girl in the foreground on the right and this is the only portion of that image that has user marks 304 as foreground. The girl's dress has some texture and the girl, including her dress, is connected to the right border of the image. The next row shows an image of a tribal woman with a child on her back and both are marked by the user as foreground. The tribal woman's skirt provides high texture and is attached to the lowermost border of the image while her headwrap extends to the uppermost border. It is a high contrast image with more color variation than some of the previous images. The last row of column 310 shows an image of an airplane in the foreground extending to the border of the image on the right. The concrete in the background closely matches the color of the airplane and in the inventors' experimentation some prior art image segmentation techniques had particular difficulty with distinguishing the cement from the airplane fuselage. This is a low contrast image.

Similar to FIG. 3A, the first column 306 in FIG. 3B shows a set of input markers 304 on each image, indicated by light shading, identifying the foreground of the image to be segmented. Optional background markers 310 are also used in the images of column 306. The set of input markers for each image comprises both the markers indicating foreground 304 and the markers indicating background 310. The images in column 308 show the output of the foreground image based on an exemplary embodiment of the invention.

Figure 4:
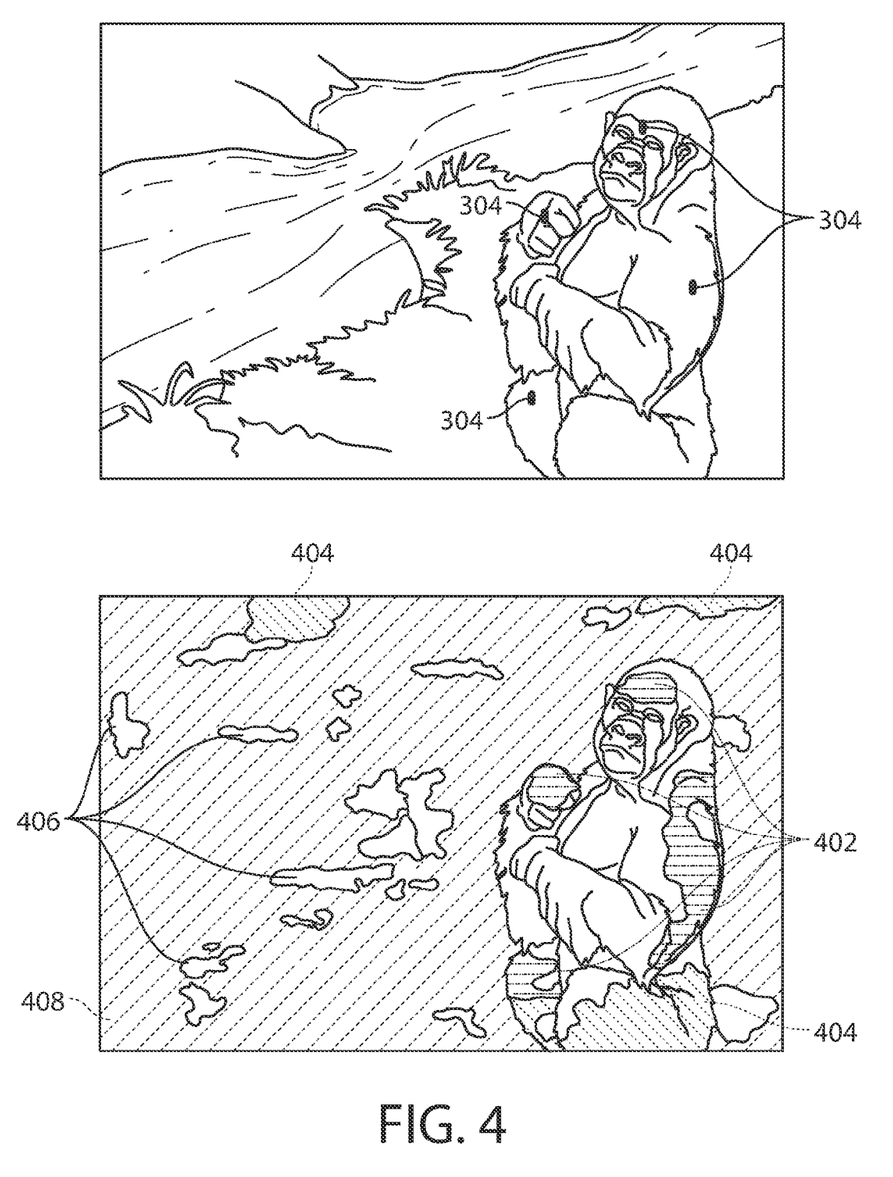
FIG. 4 is a further image to be segmented having user markers identifying foreground regions, and showing various other regions of the image that are evaluated by an algorithm according to these teachings as to whether they are foreground or background.

In FIG. 4 the top image shows a blown up version of the gorilla image from FIG. 3A. The same input markers 304 are placed on the foreground of the image. The bottom image shows various different regions as used in embodiments of the invention. Regions 402 are the regions following pre-segmentation that are defined by the set of input markers, while border regions 404 are possible foreground regions due to their color matching with the user-marked foreground regions 402. The remainder 408 of the lower portion of FIG. 4 is made up of regions that are determined as background after intelligent background selection. Isolated regions 406 are regions yet to be determined as foreground, background or ambiguous regions.

Figure 5:
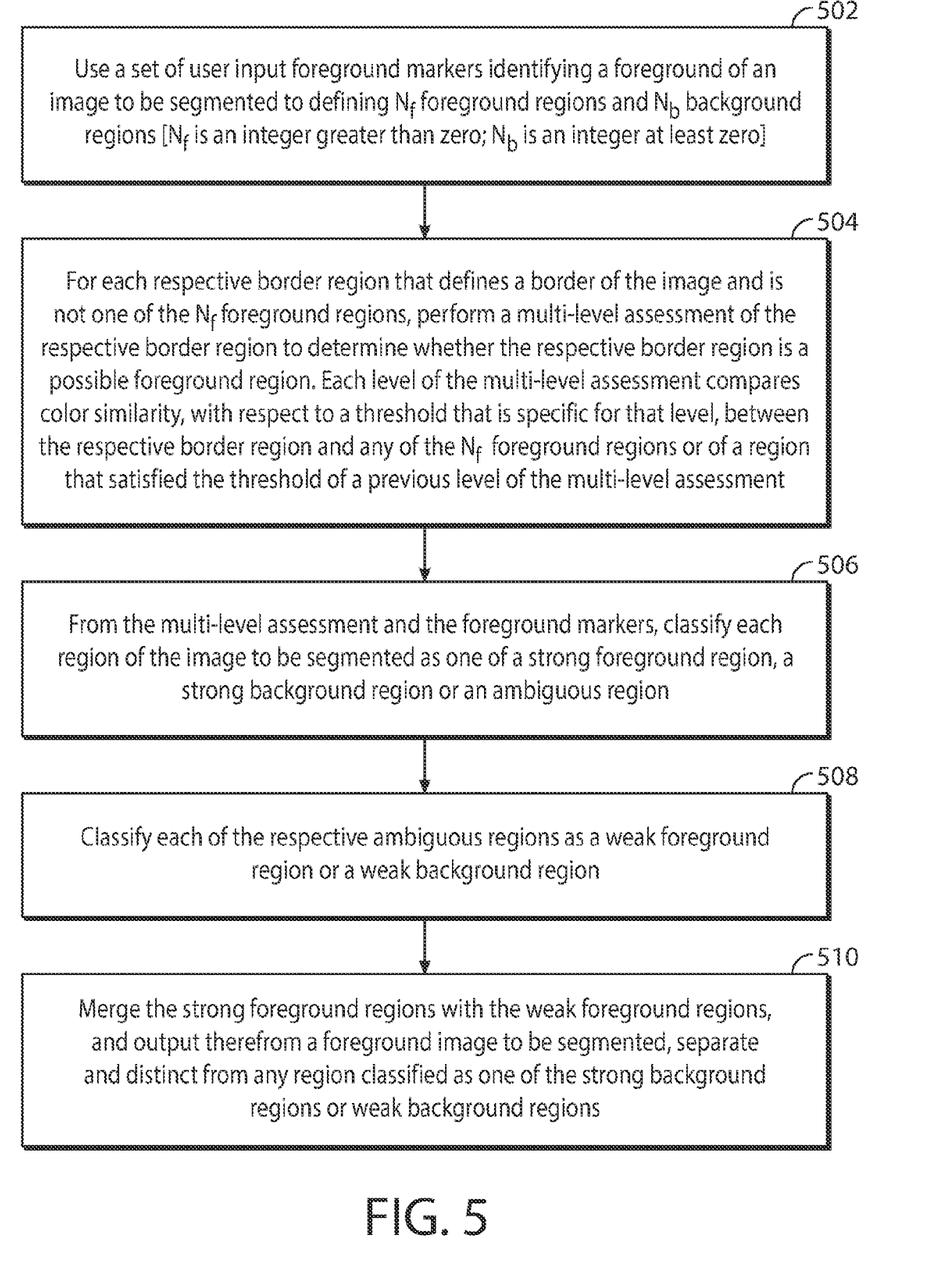
FIG. 5 is a process flow diagram showing operation of an apparatus according to certain exemplary embodiments of these teachings.

FIG. 5 is a logic flow diagram that summarizes some of the above embodiments for segmenting an image using a computer, termed broadly as simply a device. Referring to FIG. 5, at block 502 a device using a set of user input foreground markers that identify a foreground of an image to be segmented, defines $N_f$ foreground regions and $N_b$ background regions, where $N_f$ is an integer greater than zero and $N_b$ is an integer at least zero.

In one embodiment the set of user input consists of only the foreground markers, and the $N_f$ foreground regions and $N_b$ background regions are defined from the image using a mean shift algorithm. In another embodiment the set of user inputs includes user input foreground markers identifying the foreground of the image to be segmented, and also user input background markers identifying a background of the image to be segmented.

In general terms and as summarized at block 504, for each respective border region that defines a border of the image and is not one of the $N_f$ foreground regions, the above-described algorithm performs a multi-level assessment of the respective border region to determine whether the respective border region is a possible foreground region.

Each level of the multi-level assessment compares color similarity, with respect to a threshold that is specific for that level, between the respective border region and a) any of the $N_f$ foreground regions or b) of a region that satisfied the threshold of a previous level of the multi-level assessment.

In the specific embodiment detailed above, an initial level of the multi-level assessment comprises comparing a color distance between the respective border region and each of the $N_f$ foreground regions and concluding the respective border region is a similar border region $B_{sim}$ if the color distance is within a first threshold thr. While the implementation above utilized the equation diff $D_i = \min(d(M_f) - d(B_i^{new}{}_{i=1, 2, \ldots, m}))$ for this initial level, it is not necessary in all embodiments that the border regions first be merged to yield the $B_i^{new}$ border regions before conducting this initial level assessment. For implementations in which such border region merging is accomplished, then as detailed more particularly above prior to the initial level each border region $B_i$ is merged with adjacent regions $A_j$ thereof if an inter-color distance between the border region $B_i$ and any respective adjacent region $A_j$ is within a minimum color distance $d_i$, to result in new border regions $B_{new}$ for which the color distance diff $D_i$ is compared against each of the $N_f$ foreground regions during the initial level of the assessment.

For this multi-level assessment the specific implementation above details that a subsequent level following the initial level of the multi-level assessment comprises comparing similarity of color histograms of each similar border regions $B_{sim}$ that are output from the initial level as possible foreground regions against color histograms of other border regions that were not output from the initial level as possible foreground regions. It is these similar border regions $B_{sim}$ that satisfy the threshold of the previous level as step 504 states. In this subsequent level, if the similarity of the color histograms is greater than a second threshold X then it is concluded that the respective other border region $B_{mat}$ is a possible foreground region. The possible foreground regions $P_f$ resulting from both the initial and subsequent levels of the assessment are then the similar border regions $B_{sim}$ and the other border regions $B_{mat}$.

Returning to FIG. 5, the next main step at block 506 is that, from the multi-level assessment and the foreground markers, each region of the image to be segmented is classified as one of a strong foreground region, a strong background region or an ambiguous region.

More specifically, the algorithm detailed by example above has the strong foreground regions consisting of the $N_f$ foreground regions that are identified by the user marked foreground markers and the possible foreground regions $P_f$. The strong background regions consist of the new border regions $B_{new}$ that are not output from the subsequent level as possible foreground regions $B_{mat}$, along with any further region identified by any user input background marker that may have been input, as a background of the image to be segmented. A discrimination filter is utilized to find the ambiguous regions $G_i$ which are neither strong foreground regions nor strong background regions. In the detailed implementation above the user-marked $N_f$ foreground regions and the background are all input to the discrimination filter which outputs the strong foreground regions, strong background regions and ambiguous regions. In this case the background is designated above as $B_{init}$, which is the user marked background regions $M_b$ (if any) plus all the possible background regions $P_b$, where $P_b$ is all the $B_{new}$ that are not considered as possible foreground regions $P_f$.

FIG. 5 then has at block 508 classifying each of the respective ambiguous regions as a weak foreground region or a weak background region. The more detailed implementation above classifies each of these respective ambiguous regions $G_i$ as a weak foreground region or a weak background region by comparing an inter-color distance between each respective ambiguous region $G_i$ and its adjacent regions $A_j$ and merging the respective ambiguous region $G_i$ with the adjacent region $A_j$ that is nearest in color distance to the respective ambiguous region $G_i$. This classifies each ambiguous region $G_i$, after the merging, as either a weak foreground region $W_f$ or a weak background region $W_b$. More concisely, in this step there is a comparing of color of each ambiguous region $G_i$ against color of regions adjacent thereto and a merging the respective ambiguous region $G_i$ with its adjacent region having the most similar color.

FIG. 5 concludes with step 510 at which the strong foreground regions are merged with the weak foreground regions and from this merging is output a foreground image of the (original) image to be segmented, and it is output separate and distinct from any region that is classified as one of the strong background regions or one of the weak background regions. Such foreground images for output are shown by example at column 302 of FIG. 3A, and also at column 308 of FIG. 3B. This output of the foreground image may be to a tangible computer readable memory, or to a graphical display such as a computer screen or projector.

This merging at step 510 is detailed as the pruning in the non-limiting example above, which can be neatly summarized as a) merging the strong foreground regions with the weak foreground regions $W_f$, b) merging the strong background regions with the weak background regions $W_b$; c) filling gaps that are surrounded by the merged strong and weak foreground regions; and d) depending on the user input foreground markers, removing from the merged and filled strong and weak foreground regions [part c) above] any isolated regions. From this more particularized merging/pruning step is output the foreground image, which in this case is separate and distinct from the merged strong and weak background regions and also separate and distinct from any removed isolated regions.

The logic diagram of FIG. 5 may be considered to illustrate the operation of a method, and a result of execution of a computer program stored in a computer readable memory, and a specific manner in which components of an electronic device are configured to cause that electronic device to operate. The various blocks shown in FIG. 5 may also be considered as a plurality of coupled logic circuit elements constructed to carry out the associated function(s), or specific result of strings of computer program code or instructions stored in a memory.

Figure 6:
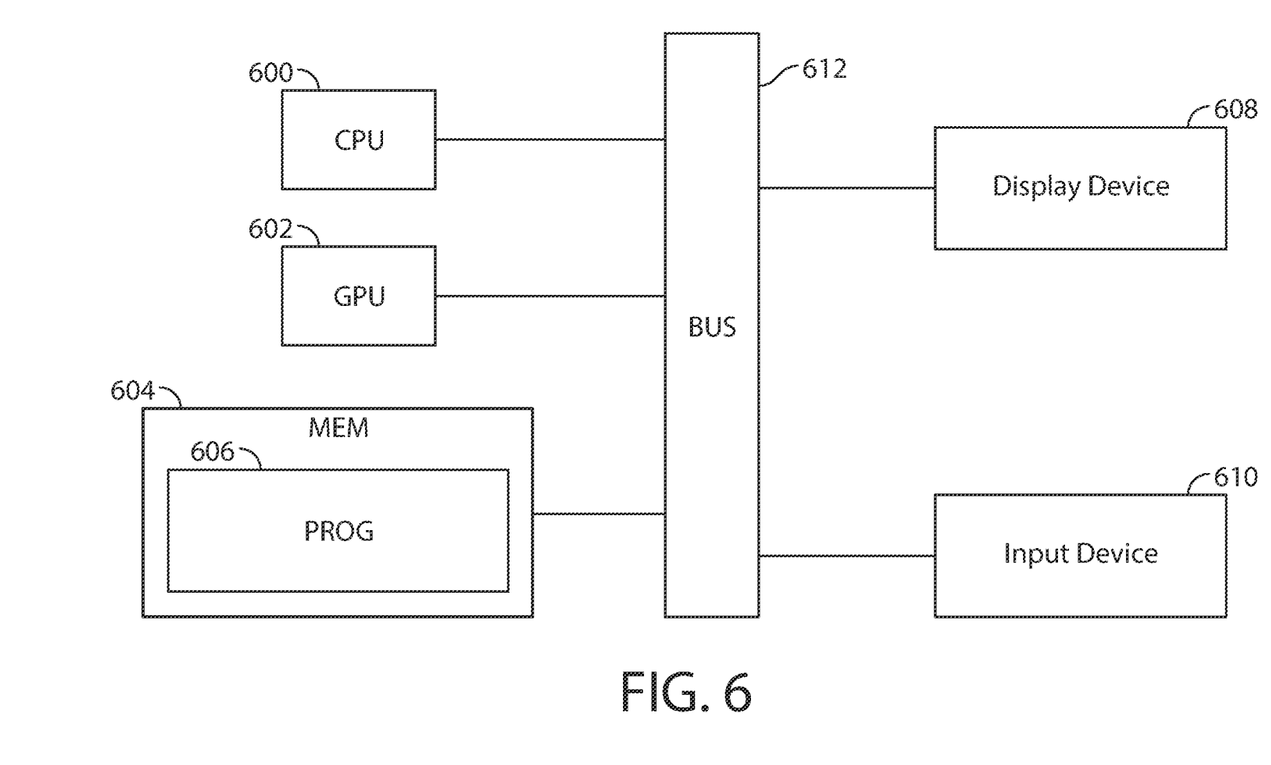
FIG. 6 is a high level schematic block diagram illustrating a computing device that is suitable for practicing the described and exemplary embodiments of these teachings.

As shown in the high level block diagram of FIG. 6 a computing system is shown, which includes processing means such as at least one central processing unit (CPU) 600, a graphics processing unit (GPU) 602, storing means such as at least one computer-readable memory (MEM) 604 storing at least one computer program (PROG) 606, a display device 608, and an input device 610, which are connected to communicate with one another through a bus 612. Also stored in the MEM 604 at reference number 606 are the computer code or computer implementable algorithm(s) for the computer system to define foreground and background regions of an image to be segmented, quantize similarity of border regions, and classify regions as foreground or background according to the exemplary embodiments described above.

The computer readable memory 604 may comprise a random access memory (RAM) and a mass storage. Various embodiments of the computer readable MEMs 604 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like.

The CPU 600, the GPU 602, and the memory 604 are shown as separate components, however in some embodiments, the memory 604 may be integrated with one or both of the CPU 600 and the graphics processor 602. In some embodiments, the memory 604 may be shared dynamically by the CPU 600 and the graphics processor 602. In some embodiments, memory 604 is used by the CPU 600, and a second graphics RAM is dedicated for the use by the graphic processor 602. In some embodiments, the GPU 602 may be integrated with the CPU 600. In some embodiments, the computer system in FIG. 6 may lack a dedicated GPU 602, and the CPU 600 may be adapted to perform computations in place of the GPU 602. The CPU 600 and the graphic processor 602 may be operating in either single precision floating point (32-bit) or double precision floating point (64-bit) format.

The input device 610 may be a commonly known device for providing user input to a computer system, such as a mouse, a keyboard, a touch pad and/or a touch screen, or a transducer (e.g., a microphone) in conjunction with voice recognition software. The display device 608 may be a commonly known graphical display screen or projector for displaying graphical images to a user. Although shown as separate blocks, the display device 608 and the input device 610 may be integrated with one another, such as may be the case with a touch screen device. In some embodiments, the bus 612 may include a north bridge for connecting the CPU 600, the graphics processor 602, and the memory 604, and a south bridge for connecting the display device 608 and the input device 610.

In some embodiments, the input device 610 is adapted to provide commands to select a set of input markers identifying a foreground and/or a background of an image to the CPU 600. The commands may be entered through a user interface displayed on the display device 608. For example, a user many select an image, select a portion of the image which represents a background or foreground of the image through the user interface. The image may be a picture, a graphic, a video or the like. In some embodiments, the application of the input markers may be triggered by another program running on the computer system. The image file may be stored on the memory 604 and retrieved by the CPU 600 to be displayed on the display device 608.

In response to a command to select a set of input markers of an image, the CPU 600 may be adapted to execute codes stored in the memory 604. In some embodiments the computer system may be adapted to apply embodiments of the invention to a single image, a video comprising a series of still images, or some other video file such as a compressed video file. The outputted foreground image and/or regions classified, considered or marked as background, may be displayed on the display device 608 and stored into the memory 604.

In general, the various embodiments of the computer system in FIG. 6 can include, but are not limited to workstations, servers, personal desktop computers, laptop or tablet computers, and even personal portable digital devices having wireless communication capabilities, including but not limited to handheld or wearable computers such as cellular phones and smart phones, Google glass devices, and the like.

What is claimed is:

1. A method of segmenting an image using a computer, the method comprising:

using a set of user input foreground markers identifying a foreground of an image to be segmented, defining $N_f$ foreground regions and $N_b$ background regions, where $N_f$ is an integer greater than zero and $N_b$ is an integer at least zero;

for each respective border region that defines a border of the image and is not one of the $N_f$ foreground regions, performing a multi-level assessment of the respective border region to determine whether the respective border region is a possible foreground region, where each level of the multi-level assessment compares color similarity, with respect to a threshold that is specific for that level, between the respective border region and any of the $N_f$ foreground regions or of a region that satisfied the threshold of a previous level of the multi-level assessment;

from the multi-level assessment and the foreground markers, classifying each region of the image to be segmented as one of a strong foreground region, a strong background region or an ambiguous region;

classifying each of the respective ambiguous regions as a weak foreground region or a weak background region; and merging the strong foreground regions with the weak foreground regions and output therefrom, to a tangible memory or to a graphical display, a foreground image of the image to be segmented, separate and distinct from any region classified as one of the strong background regions or weak background regions.

2. The method according to claim 1, wherein the set of user inputs consists of only the foreground markers, and the $N_f$ foreground regions and $N_b$ background regions are defined from the image using a mean shift algorithm.

3. The method according to claim 1, wherein an initial level of the multi-level assessment comprises:

comparing a color distance between the respective border region and each of the $N_f$ foreground regions and concluding the respective border region is a similar border region $B_{sim}$ if the color distance is within a first threshold thr.

4. The method according to claim 3, wherein prior to the initial level each border region $B_i$ is merged with adjacent regions $A_j$ thereof if an inter-color distance between the border region $B_i$ and any respective adjacent region $A_j$ is within a minimum color distance $d_i$, to result in new border regions $B_{new}$ for which the color distance diff $D_i$ is compared against each of the $N_f$ foreground regions during the initial level of the assessment.

5. The method according to claim 3, wherein a subsequent level following the initial level of the multi-level assessment comprises:

comparing similarity of color histograms of each similar border regions $B_{sim}$ that are output from the initial level as possible foreground regions against color histograms of other border regions that were not output from the initial level as possible foreground regions, and if the similarity of the color histograms is greater than a second threshold X concluding that the respective other border region $B_{mat}$ is a possible foreground region, such that the possible foreground regions $P_f$ are the similar border regions $B_{sim}$ and the other border regions $B_{mat}$.

6. The method according to claim 5, wherein:
the strong foreground regions consist of the $N_f$ foreground regions identified by the user marked foreground markers and the possible foreground regions $P_f$;
the strong background regions consist of the new border regions $B_{new}$ that are not output from the subsequent level as possible foreground regions $B_{mat}$ with any further region identified by a user input background marker as a background of the image to be segmented; and
the method further comprises utilizing a discrimination filter to find the ambiguous regions $G_i$ which are neither strong foreground regions nor strong background regions.

7. The method according to claim 1, wherein classifying each of the respective ambiguous regions $G_i$ as a weak foreground region or a weak background region comprises:
comparing color of each ambiguous region $G_i$ against color of regions adjacent thereto and merging the respective ambiguous region $G_i$ with its adjacent region having the most similar color.

8. The method according to claim 7, wherein merging the strong foreground regions with the weak foreground regions comprises:
merging the strong foreground regions with the weak foreground regions $W_f$;
merging the strong background regions with the weak background regions $W_b$;
filling gaps that are surrounded by the merged strong and weak foreground regions; and
depending on the user input foreground markers, removing from the merged and filled strong and weak foreground regions any isolated regions; and outputting therefrom the foreground image, separate and distinct from the merged strong and weak background regions and from any removed isolated regions.

9. The method according to claim 7, wherein each ambiguous region $G_i$ is classified as either a weak foreground region $W_f$ or a weak background region $W_b$ by:
forming set of adjacent regions $\overline{S}_B = \{A_j\}_{j=1, 2, \ldots n}$ that are adjacent to the respective ambiguous region $G_i$;
calculate an inter color distance between each respective ambiguous region $G_i$ and each of its adjacent regions $\overline{S}_B$;
merging the respective ambiguous region $G_i$ with the adjacent region $A_j$ for which the inter-color distance is lowest; and
classifying the respective ambiguous region $G_i$ as a weak foreground region $W_f$ or a weak background region $W_b$ based on whether the merged adjacent region $A_j$ is a strong foreground region $S_f$ or a strong background region $S_b$.

10. A non-transitory computer readable memory storing a program for segmenting an image, wherein the program comprises computer executable code for causing a host device to:
use a set of user input foreground markers identifying a foreground of an image to be segmented, to define $N_f$ foreground regions and $N_b$ background regions, where $N_f$ is an integer greater than zero and $N_b$ is an integer at least zero;
for each respective border region that defines a border of the image and is not one of the $N_f$ foreground regions, perform a multi-level assessment of the respective border region to determine whether the respective border region is a possible foreground region, where each level of the multi-level assessment compares color similarity, with respect to a threshold that is specific for that level, between the respective border region and any of the $N_f$ foreground regions or of a region that satisfied the threshold of a previous level of the multi-level assessment;
from the multi-level assessment and the foreground markers, classify each region of the image to be segmented as one of a strong foreground region, a strong background region or an ambiguous region;
classify each of the respective ambiguous regions as a weak foreground region or a weak background region; and
merge the strong foreground regions with the weak foreground regions and output therefrom, to a tangible memory or to a graphical display, a foreground image of the image to be segmented, separate and distinct from any region classified as one of the strong background regions or weak background regions.

11. The non-transitory computer readable memory according to claim 10, wherein the set of user inputs consists of only the foreground markers, and the $N_f$ foreground regions and $N_b$ background regions are defined from the image using a mean shift algorithm.

12. The non-transitory computer readable memory according to claim 10, wherein during an initial level of the multi-level assessment the computer executable code causes the host device to:
compare a color distance between the respective border region and each of the $N_f$ foreground regions and concluding the respective border region is a similar border region $B_{sim}$ if the color distance is within a first threshold thr.

13. The non-transitory computer readable memory according to claim 12, wherein prior to the initial level the computer executable code causes the host device to merge each border region $B_i$ with adjacent regions $A_j$ thereof if an inter-color distance between the border region $B_i$ and any respective adjacent region $A_j$ is within a minimum color distance $d_i$, to result in new border regions $B_{new}$ for which the computer executable code causes the host device to compare color distance diff $D_i$ against each of the $N_f$ foreground regions during the initial level of the assessment.

14. The non-transitory computer readable memory according to claim 12, wherein during a subsequent level following the initial level of the multi-level assessment the computer executable code causes the host device to:
compare similarity of color histograms of each similar border regions $B_{sim}$ that are output from the initial level as possible foreground regions against color histograms of other border regions that were not output from the initial level as possible foreground regions, and if the similarity of the color histograms is greater than a second threshold X to conclude that the respective other border region $B_{mat}$ is a possible foreground region, such that the possible foreground regions $P_f$ are the similar border regions $B_{sim}$ and the other border regions $B_{mat}$.

15. The non-transitory computer readable memory according to claim 14, wherein:
the strong foreground regions consist of the $N_f$ foreground regions identified by the user marked foreground markers and the possible foreground regions $P_f$;
the strong background regions consist of the new border regions $B_{new}$ that are not output from the subsequent level as possible foreground regions $B_{mat}$ with any further region identified by a user input background marker as a background of the image to be segmented; and the computer executable code comprises a discrimination filter by which is found the ambiguous regions $G_i$ which are neither strong foreground regions nor strong background regions.

16. The non-transitory computer readable memory according to claim 10, wherein the computer executable code causes the host device to classify each of the respective ambiguous regions $G_i$ as a weak foreground region or a weak background region by:

comparing an inter-color distance between each respective ambiguous region $G_i$ and its adjacent regions $A_j$ and merging the respective ambiguous region $G_i$ with the adjacent region $A_j$ that is nearest in color distance to the respective ambiguous region $G_i$ such that each merged ambiguous region $G_i$ is classified as a weak foreground region $W_f$ or a weak background region $W_b$.

17. The non-transitory computer readable memory according to claim 16, wherein merging the strong foreground regions with the weak foreground regions comprises:

merging the strong foreground regions with the weak foreground regions $W_f$;

merging the strong background regions with the weak background regions $W_b$;

filling gaps that are surrounded by the merged strong and weak foreground regions; and depending on the user input foreground markers, removing from the merged and filled strong and weak foreground regions any isolated regions; and outputting therefrom the foreground image, separate and distinct from the merged strong and weak background regions and from any removed isolated regions.

18. The non-transitory computer readable memory according to claim 10, in combination with the host device comprising at least one processor and the computer readable memory storing the program for segmenting an image.

19. A non-transitory computer readable memory storing a program for segmenting an image, wherein the program comprises computer executable code for causing a host device to:

from inputs of an image to be segmented and a set of user input foreground markers identifying a foreground of said image, determine strong foreground regions $S_f$, strong background regions $S_b$ and ambiguous regions G;

classify each ambiguous region $G_i$ as either a weak foreground region $W_f$ or a weak background region $W_b$ by comparing color of each ambiguous region $G_i$ against color of regions adjacent thereto and merging the respective ambiguous region $G_i$ with its adjacent region having the most similar color; and merge the strong foreground regions $S_f$ with the weak foreground regions $W_f$ and output therefrom, to a tangible memory or to a graphical display, a foreground image of the image to be segmented, separate and distinct from any region classified as one of the strong background regions or weak background regions.

20. The non-transitory computer readable memory according to claim 19, wherein each ambiguous region $G_i$ is classified as either a weak foreground region $W_f$ or a weak background region $W_b$ by:

forming set of adjacent regions $\overline{S}_B = \{A_j\}_{j=1, 2, \ldots, n}$ that are adjacent to the respective ambiguous region $G_i$;

calculate an inter color distance between each respective ambiguous region $G_i$ and each of its adjacent regions $\overline{S}_B$;

merging the respective ambiguous region $G_i$ with the adjacent region $A_j$ for which the inter-color distance is lowest; and classifying the respective ambiguous region $G_i$ as a weak foreground region $W_f$ or a weak background region $W_b$ based on whether the merged adjacent region $A_j$ is a strong foreground region $S_f$ or a strong background region $S_b$.

* * * * *